US005699158A

United States Patent [19]
Negishi

[11] Patent Number: 5,699,158
[45] Date of Patent: Dec. 16, 1997

[54] APPARATUS FOR ACCURATELY DETECTING RECTILINEAR MOTION OF A MOVING OBJECT USING A DIVIDED BEAM OF LASER LIGHT

[75] Inventor: Mahito Negishi, Tachikawa, Japan

[73] Assignee: Canon Kabushiki Kaisha, Tokyo, Japan

[21] Appl. No.: 325,564

[22] Filed: Oct. 19, 1994

[30] Foreign Application Priority Data

Oct. 27, 1993 [JP] Japan .................................. 5-291257

[51] Int. Cl.$^6$ ...................................................... G01B 9/02
[52] U.S. Cl. ........................ 356/345; 356/353; 356/358
[58] Field of Search .................................. 356/345, 358, 356/353, 349, 355, 357

[56] References Cited

U.S. PATENT DOCUMENTS

| | | | |
|---|---|---|---|
| 3,419,898 | 12/1968 | Baldwin et al. | 356/358 |
| 3,881,105 | 4/1975 | De Lang et al. | 356/351 |
| 4,334,779 | 6/1982 | Domey et al. | 356/358 |
| 5,026,162 | 6/1991 | Langdon | 356/363 |
| 5,355,220 | 10/1994 | Kobayashi et al. | 356/356 |

FOREIGN PATENT DOCUMENTS 1099185  6/1960  Germany .

OTHER PUBLICATIONS

Naess, "A measuring Interferometer for high Accuracy alignment", Nov. 1968, Applied Optics Vol. 7 No. 11, pp. 2315–2317.

N. Ikawa, et al., "Laser Beam as a Straight Datum and its Application to Straightness Measurement at Nanometer Level.", Annals of the CIRP, pp. 523–526, vol. 37, No. 1 (1988). (no month available).

*Primary Examiner*—Frank G. Font
*Assistant Examiner*—Robert Kim
*Attorney, Agent, or Firm*—Fitzpatrick, Cella, Harper & Scinto

[57] ABSTRACT

A laser beam produced from a laser source is divided into two divisional beams (plane waves) by the half mirror of a prism unit, and the two divisional beams are reflected by the two inclined surfaces of the prism unit, whereafter they intersect each other and create a composite wave (interference fringes) by interference. A two-division pin photodiode moving with a moving object detects the light intensity of the resulting composite wave, and measures the displacement of the moving object in a direction orthogonal to the direction of movement thereof on the basis of a variation in the detected intensity.

12 Claims, 7 Drawing Sheets

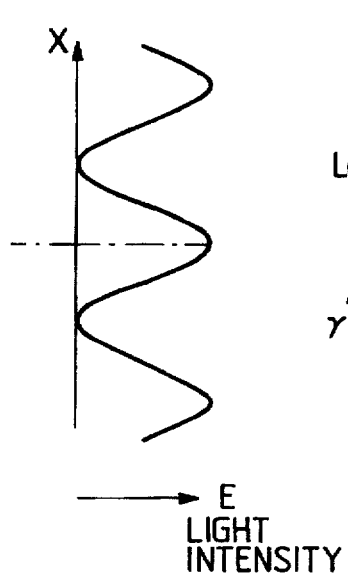
FIG. 2A
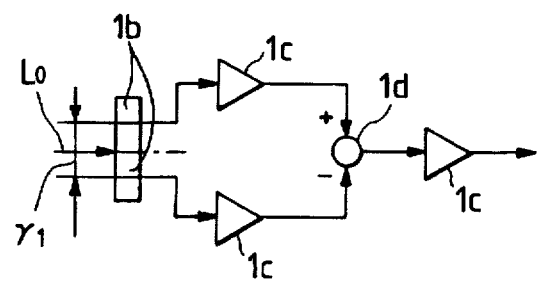
FIG. 2B
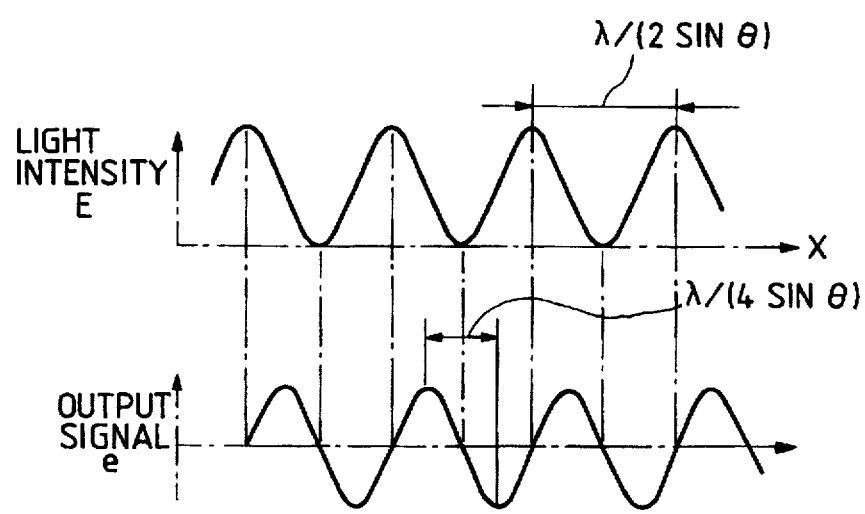
FIG. 3A
FIG. 3B

APPARATUS FOR ACCURATELY DETECTING RECTILINEAR MOTION OF A MOVING OBJECT USING A DIVIDED BEAM OF LASER LIGHT

BACKGROUND OF THE INVENTION

1. Field of the Invention

This invention relates to an apparatus for measuring the accuracy of the movement of a moving object such as a movable stage for effecting the positioning of a workpiece or an object to be measured in various precision working machines or various measuring apparatuses.

2. Related Background Art

In various precision working machines and measuring apparatuses, when a moving object such as a movable stage for effecting the positioning of a workpiece or an object measured is to be moved along a straight path, it is required to accurately monitor whether the moving object is effecting rectilinear movement without deviating from movement path. An apparatus for measuring the movement accuracy of the moving object effecting such rectilinear movement (hereinafter referred to as the "rectilinear movement accuracy") has been developed as shown in FIG. 11 of the accompanying drawings. This apparatus is such that an XY fine movement stage 102 driven by a piezo-actuator 104 is provided on a moving object $M_O$ reciprocally movable along a predetermined movement path in a predetermined direction (hereinafter referred to as the "Z-axis direction") on a base $B_O$ fixed to a bed board $F_O$. A laser beam emitted in the Z-axis direction from a light source 101 fixed to the bed board $F_O$ is applied to a four-division pin photodiode (QPD) 103 supported by the XY fine movement stage 102 and the output thereof is fed back to the piezo-actuator 104 to thereby control the light receiving position of the four-division pin photodiode 103 so as to be always constant. Also, a voltage applied to the piezo-actuator 104 at this time is detected to thereby measure the displacements $\Delta x$ and $\Delta y$ of the moving object $M_O$ in the directions of two axes (X-axis and Y-axis) perpendicular to the Z-axis (see Annals of the CIRP, Vol. 37/1/1988, p. 523).

The rectilinear movement accuracy of the moving object $M_O$ is obtained by measuring the displacements $\Delta x$ and $\Delta y$ of the moving object $M_O$ in the X-axis direction and the Y-axis direction as shown in FIG. 12 of the accompanying drawings. If required, displacements $\Delta x$ and $\Delta y$ of a plurality of regions of the moving object $M_O$ are detected by the use of a plurality of four-division pin photodiodes, and on the basis thereof, detects the angles of inclination $\Delta \theta x$ and $\Delta \theta y$ of the moving object $M_O$ with respect to the movement path thereof and the angle of rotation $\Delta \theta z$ of the moving object $M_O$ about the Z-axis.

However, according to the above-described prior art, it is difficult to obtain sufficient measurement accuracy. The reasons for this are as follows.

(1) Variation with Time and Instability of the Optical Axis of Laser Beam.

When thermal strain or positional deviation is created in the mirror of a resonator by the heat generation of a laser source, the optical axis of the laser beam deviates in the X-axis direction or the Y-axis direction or becomes inclined with respect to the Z-axis and the light receiving point of the moving object deviates to cause a measurement error. To prevent this, highly accurate temperature control for preventing the temperature change of the laser source and the apparatus around it is required, increasing cost.

(2) Variation in the Energy Distribution of the Laser Beam.

The energy distribution of the laser beam generally tends to vary along the optical path thereof and therefore, the output of the pin photodiode varies.

(3) The Detection of Minute Displacements is Difficult.

To detect minute displacements, it is desirable to use a thin laser beam, but if the laser beam is too thin, the beam diameter will conversely increase because of diffraction, and if the movement distance of the moving object is great, sufficient measurement accuracy is not obtained. For example, when calculating Fraunhofer diffraction with respect to a laser beam of a wavelength 0.6 μm having a square cross-section having each side of 0.1 mm, such a laser beam is enlarged into a laser beam having a square cross-section having measuring 12 mm or longer on a side at a range of 1 mm. Accordingly, where the moving object is moved by a distance of 1 m or greater, such a thin laser beam cannot be used.

(4) Dimensional Variation, etc. of the Moving Object by the Heat Generation of the Laser Source.

When the spacing between the laser source and the moving object is small, thermal strain is created in the moving object and a device supporting it by the heat generation of the laser source and the dimensions of these are varied.

SUMMARY OF THE INVENTION

The present invention has been made in view of the above-noted problems peculiar to the prior art and the object thereof is to provide an apparatus for detecting rectilinear motion of a moving object which is free of any error caused by the displacement of the optical axis of illuminating light such as by laser beam or a variation in the light intensity distribution of the illuminating light. Moreover, the apparatus can accurately detect very minute positional deviations of a moving object.

To achieve the above object, one form of the apparatus of the present invention has light intensity detecting means rectilinearly movable along a predetermined movement path with a moving object, and composite wave generating means for dividing an illuminating light into a pair of plane waves, reflecting one of the plane waves an even number times and the other plane wave an odd number times, and thereafter causing the two plane waves to interfere with each other to thereby generate a composite wave along the movement path. The light intensity detecting means is designed to detect the light intensity of said composite wave.

Also, the composite wave generating means may preferably have a half mirror provided in the optical path of the illuminating light, and a prism unit comprising a pair of prisms disposed so as to be plane-symmetrical with each other with respect to the half mirror.

A composite wave generated by the interference between a pair of plane waves having the same light intensity distribution which have been obtained by dividing an illuminating light is formed in the movement path of the light intensity detecting means movable with the moving object. This composite wave has a light intensity distribution creating interference fringes of a fringe width $\lambda/(2\sin\theta)$ ($\lambda$: the wavelength of each plane wave, $\theta$: ½ of the angle at which the two plane waves intersect each other) in a direction orthogonal to said movement path. Since this is invariable along the movement path, the positional deviation of the moving object relative to the movement path can be measured highly accurately by detecting any variation in the light intensity of a predetermined portion of the composite wave by the light intensity detecting means. If before the two plane waves are caused to interfere with each other, one of the plane waves is reflected an even number of times and the other plane wave is reflected an odd number of times, even if positional deviation occurs in the illuminating light or the light intensity distribution thereof varies, it will be offset by the interference between the two plane waves. Therefore, the composite wave will not be affected by these and accordingly, there is no possibility of any measurement error being caused by these. Also, there is no possibility of measurement accuracy being varied by the beam diameter of the illuminating light. Moreover, even very minute positional deviations can be detected with high accuracy.

BRIEF DESCRIPTION OF THE DRAWINGS

FIG. 2A and FIG. 2B show a two-division pin photodiode unit and the light intensity distribution in the first embodiment, FIG. 2A being a graph showing the light intensity distribution, and FIG. 2B being an illustration illustrating the two-division pin photodiode unit.

FIGS. 3A and 3B are graphs showing the relation between the output of the two-division pin photodiode unit and the light intensity distribution in the first embodiment.

DETAILED DESCRIPTION OF THE PREFERRED EMBODIMENTS

Some embodiments of the present invention will hereinafter be described with reference to the drawings.

Figure 1:
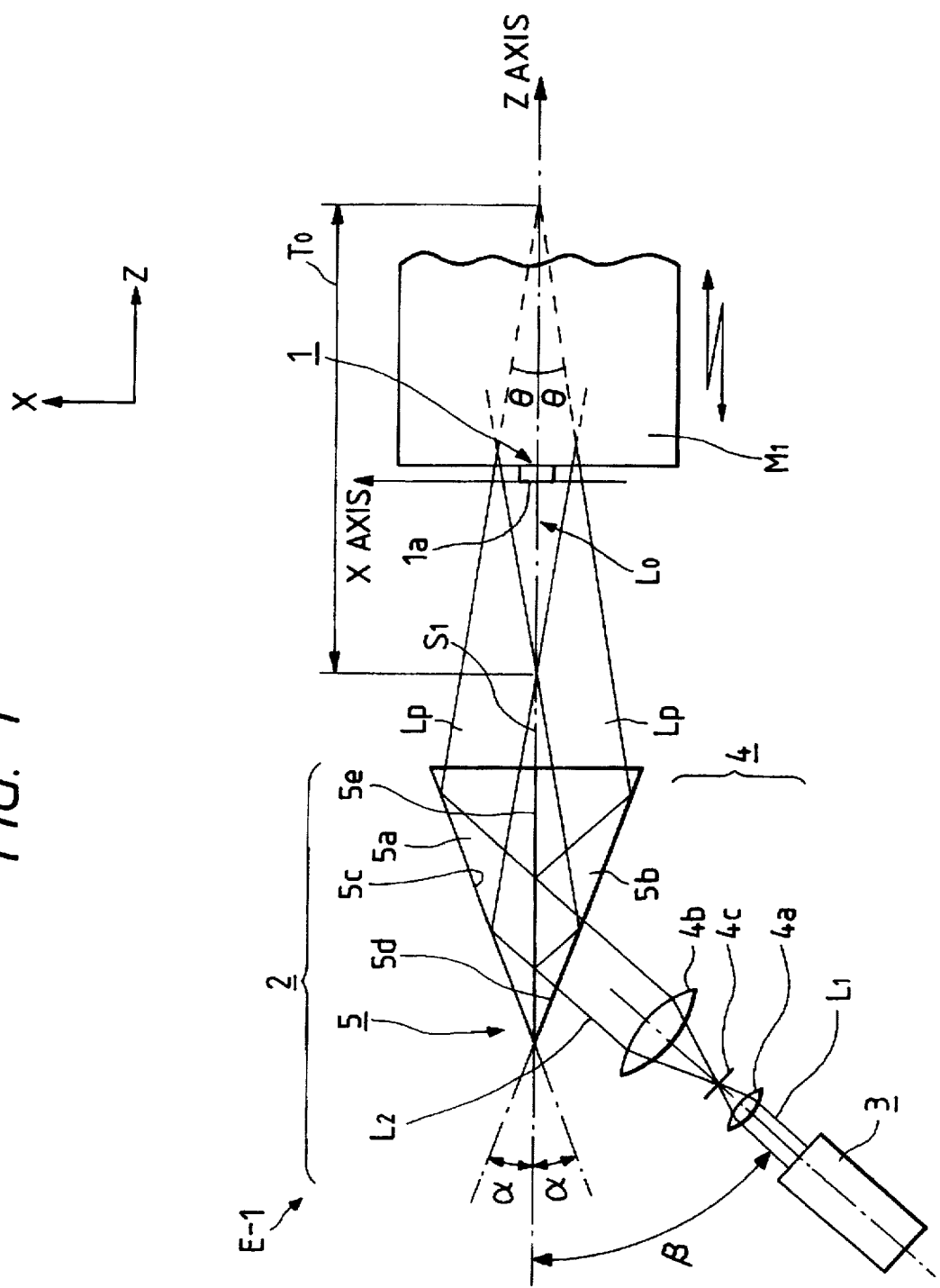
FIG. 1 is an illustration illustrating a first embodiment of the present invention.

FIG. 1 illustrates an apparatus for detecting rectilinear motion of a moving object according to a first embodiment, which comprises a two-division pin photodiode unit 1 which is light intensity detecting means provided integrally with a moving object $M_1$ such as a positioning stage reciprocally movable in a predetermined direction (hereinafter referred to as the "Z-axis direction") along a straight movement path, and an interference fringe generating device 2 which is composite wave generating means for generating a composite wave $L_0$ in the movement path of the two-division pin photodiode unit 1 movable with the moving object $M_1$. The two-division pin photodiode unit 1 has a light receiving surface $1a$ parallel to a plane (XZ plane) containing the Z-axis and one of two axes orthogonal thereto (hereinafter referred to as the "X-axis"), and is designed to detect the light intensity of the central portion of the composite wave $L_0$ generated by the interference fringe generating device 2. The interference fringe generating device 2 comprises a laser source 3, an enlarging optical system 4 for enlarging a laser beam which is illuminating light produced by the laser source 3 into an enlarged beam $L_2$ of a predetermined width, and a prism unit 5 for dividing the enlarged beam $L_2$ into divisional beams $L_P$ which are a pair of plane waves for reflecting one of the divisional beams an even number of times and reflecting the other of the divisional beams an odd number of times. The enlarging optical system 4 comprises a pair of lenses $4a$ and $4b$ and a stop $4c$ disposed at the focus position of the two lenses. The prism unit 5 comprises a pair of rectangular triangle pole prisms $5a$ and $5b$ each having a vertical angle $\alpha$ and joined together with a half mirror $5e$ perpendicular to the light receiving surface $1a$ of the two-division pin photodiode unit 1 being interposed therebetween, the half mirror $5e$ is half-transmitting film secured to one of the two rectangular triangle pole prisms $5a$ and $5b$. The inclined surfaces $5c$ and $5d$ of the rectangular triangle pole prisms $5a$ and $5b$, respectively, are disposed so as to be plane-symmetrical with respect to the half mirror.

The enlarged beam $L_2$ is applied to the half mirror $5e$ via one inclined surface $5d$ of the prism unit 5, and is divided into a pair of divisional beams $L_P$ by the half mirror $5e$. The divisional beams $L_P$ are totally reflected by the respective inclined surfaces $5c$ and $5d$ of the prism unit 5 and intersect each other at an angle $2\theta$ along the extension surface $S_1$ of the half mirror $5e$, and become a composite wave $L_0$ perpendicular to the light receiving surface $1a$ of the two-division pin photodiode unit 1. One of the two divisional beams $L_P$ is reflected by the half mirror $5e$, whereafter it is totally reflected by one inclined surface $5d$, and the other divisional beam $L_P$ is transmitted through the prism unit 5, whereafter it is reflected by the other inclined surface $5c$. That is, one of the two divisional beams $L_P$ is reflected twice which is an even number of times, and the other divisional beam is reflected once which is an odd number of times, whereafter they interfere with each other to create the composite wave $L_0$. There is the relation that $\theta=\beta-2\alpha$ among the angle of incidence $\beta$ of the enlarged beam $L_2$ onto the half mirror $5e$, the vertical angle $\alpha$ of each rectangular triangle pole prism $5a$, $5b$ and the angle $\theta$ at which the two divisional beams $L_P$ intersect the extension surface of the half mirror $5e$. Accordingly, to create the composite wave $L_0$ by the two divisional beams $L_P$, there must be the relation that $\theta>0$, namely, $\beta>2\alpha$.

The composite wave $L_0$ has a light intensity distribution $E(x)$ in the X-axis direction as shown in FIG. 2A, and creates interference fringes of a fringe width $\lambda/2(\sin\theta)$ on the light receiving surface $1a$ of the two-division pin photodiode unit 1. The light intensity distribution of the composite wave $L_0$ is invariable along the length $T_0$ of the composite wave $L_0$ (the dimension in the Z-axis direction of the area in which the two divisional beams $L_P$ interfere with each other) and accordingly, when the moving object $M_1$ moves in the Z-axis direction along a predetermined movement path, the positional deviation of the interference fringes formed on the light receiving surface $1a$ of the two-division pin photodiode unit 1 is detected, whereby the positional deviation of the moving object $M_1$ in the X-axis direction relative to said movement path can be measured accurately. The light intensity distribution of the composite wave $L_0$, for a reason which will be set forth later, is invariable even if the light intensity distribution of the laser beam $L_1$ produced from the laser source 3, in the X-axis direction, varies, and the position thereof neither varies even if the optical axis of the laser beam $L_1$ deviates or the angle thereof changes.

The two-division pin photodiode unit 1, as shown in FIG. 2B, comprises a pair of pin photodiodes $1b$, an amplifier $1c$ for amplifying the output of each pin photodiode $1b$, a subtraction circuit $1d$ for calculating the difference between the outputs of the pin photodiodes $1b$ amplified by the amplifiers $1c$, and an amplifier $1e$ for amplifying the output of the subtraction circuit $1d$. The respective light receiving surfaces of the two pin photodiodes $1b$ are disposed so that when the moving object $M_1$ is not causing any positional deviation in the X-axis direction, the centers of the light receiving surfaces of the pin photodiodes $1b$ may be spaced apart from each other in opposite directions by an equidistance from the optical axis of the composite wave $L_0$, and it is desirable that the distance $r_1$ between the centers of the respective light receiving surfaces of the two pin photodiodes $1b$ be $\lambda/(4\sin\theta)$ (a half of the fringe width of the interference fringes created on the light receiving surface $1a$ of the two-division pin photodiode unit 1).

The output from the subtraction circuit $1d$ via the amplifier $1e$, as shown in FIGS. 3A and 3B, is varied by the displacement of the interference fringes on the light receiving surface $1a$ of the two-division pin photodiode unit 1 when the two-division pin photodiode unit 1 moves in the X-axis direction with the positional deviation of the moving object $M_1$ in the X-axis direction. Any disturbance included in the outputs of the two pin photodiodes $1b$ by the thermal strain or the like of the light receiving surface $1a$ of the two-division pin photodiode unit 1 is offset by the difference between the two outputs being calculated by the subtraction circuit $1d$. Accordingly, the positional deviation of the moving object $M_1$ in the X-axis direction can be detected highly accurately from the output from the subtraction circuit $1d$ via the amplifier $1e$.

Figure 4:
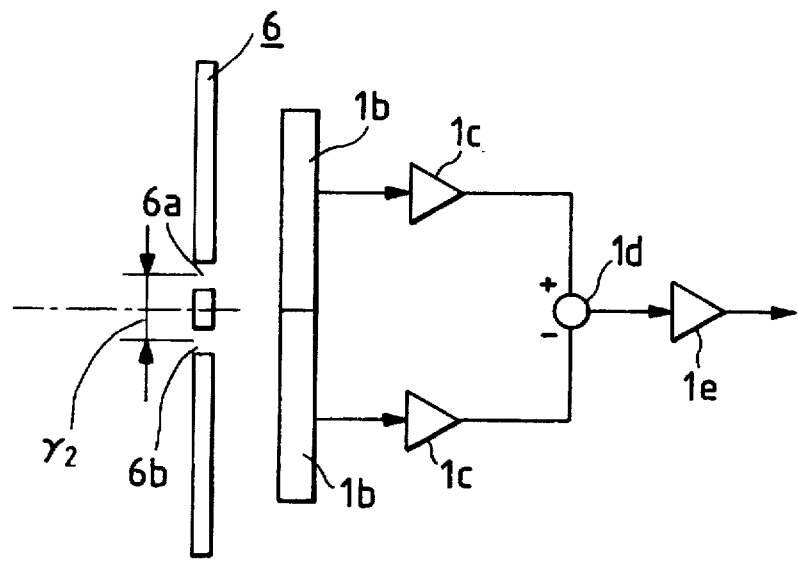
FIG. 4 shows a modification of the two-division pin photodiode unit in the first embodiment.

When the light receiving surface of each pin photodiode $1b$ is large as compared with the fringe width of the interference fringes of the composite wave $L_0$, it is desirable that as shown in FIG. 4, a mask 6 having a pair of openings $6a$ and $6b$ be provided in proximity to the light receiving surface $1a$ of the two-division pin photodiode unit 1. The distance $r_2$ between the centers of the two openings $6a$ and $6b$ be $\lambda/(4\sin\theta)$.

Figure 5:
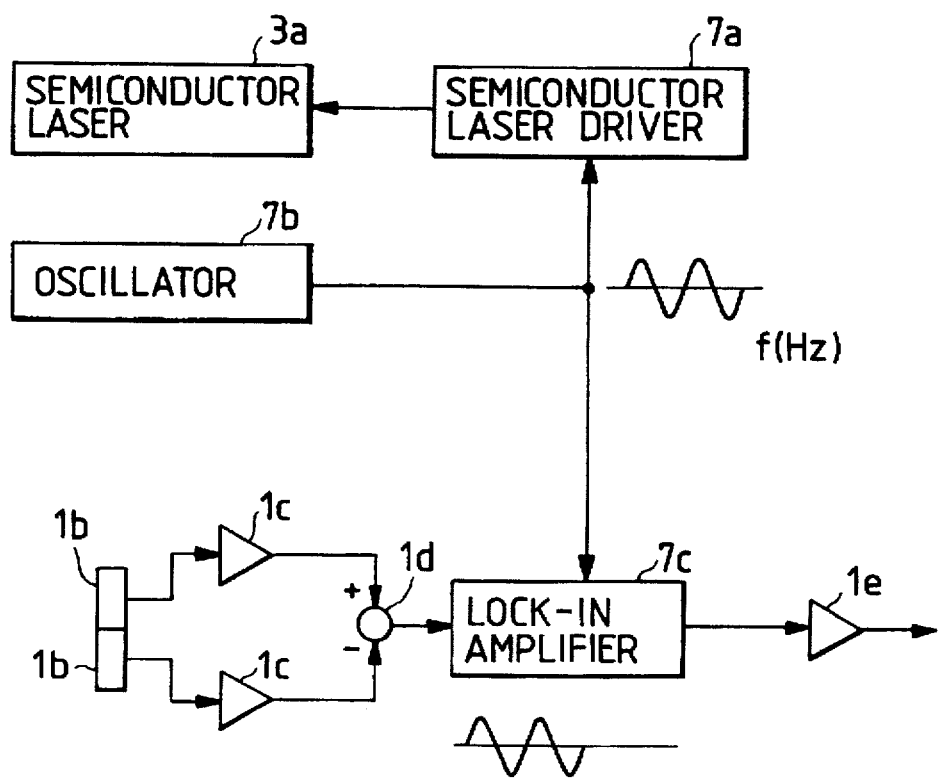
FIG. 5 is an illustration illustrating another modification of the two-division pin photodiode unit in the first embodiment and a driving device for a laser source.

Further, in order to prevent any measurement error by the disturbance due to ambient light, noise, or the like from a power source, it is preferable that as shown in FIG. 5, a semiconductor laser driver $7a$ for driving the semiconductor laser $3a$ of the laser source 3 be connected to a transmitter $7b$ for generating a voltage waveform of a frequency f (Hz) so that the laser beam $L_1$ of the laser source 3 may be modulated to the frequency f (Hz) and only the component of the frequency f (Hz) of the output of the subtraction circuit $1d$ which calculates the difference between the outputs of the pin photodiodes $1b$ of the two-division pin photodiode unit i may be taken out by a lock-in amplifier $7c$.

According to the present embodiment, even if the light emitting point of the laser source 3 deviates, or the optical axis of the laser beam $L_1$ deviates due to the thermal strain of the mirror of a resonator, or the intensity distribution of the light emitting energy of the laser source 3 varies, or the intensity distribution of the laser beam $L_1$ varies along the optical path of the laser beam $L_1$, the light intensity distribution of the composite wave $L_0$ is invariable and there is no possibility of any measurement error being output by the two-division pin photodiode unit 1. In addition, as previously described, there is no possibility of any disturbance due to the thermal strain or the like of the light receiving surface $1a$ of the two-division pin photodiode unit 1 being included in the output of the two-division pin photodiode unit 1. Therefore, the rectilinear movement of the moving object $M_1$ can be measured highly accurately. Also, there is the advantage that any minute positional deviation within ½ of the fringe width of the interference fringes of the composite wave $L_0$, i.e., within $\lambda/(4\sin\theta)$, can be accurately detected, irrespective of the cross-sectional dimensions of the laser beam $L_1$ produced from the laser source 3. Further, even if the intensity distribution of the laser beam $L_1$ varies along the optical path thereof, the light intensity distribution of the composite wave $L_0$ is invariable and therefore, it is easy to space the laser source 3 greatly apart from the moving object $M_1$ or the two-division pin photodiode unit 1 to thereby prevent thermal strain from being created in the moving object $M_1$ and the light receiving surface $1a$ of the two-division pin photodiode unit 1 by the heat generation of the laser source 3.

Description will now be made of the reason why the light intensity distribution of the composite wave $L_0$ is invariable even if the optical axis of the laser beam $L_1$ produced from the laser source 3 deviates or the intensity distribution thereof varies.

Figure 6:
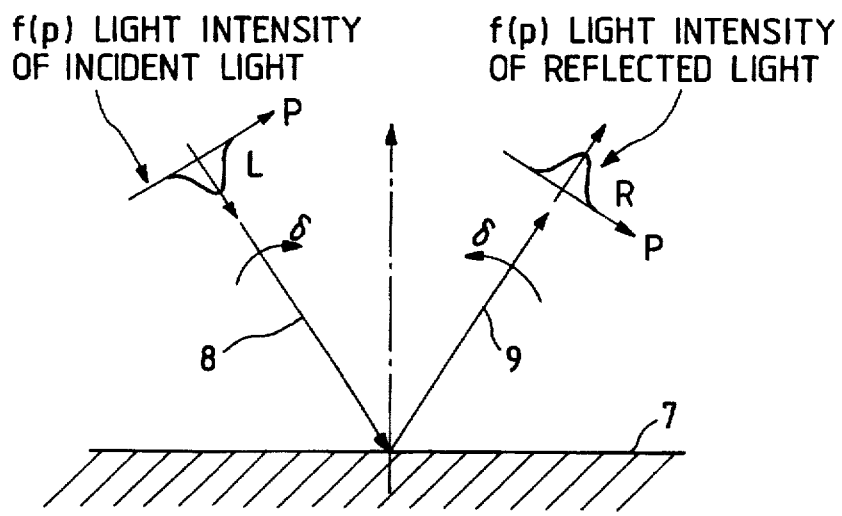
FIG. 6 is an illustration illustrating a variation in an optical axis and a variation in the light intensity distribution when the illuminating light is reflected once.

If as shown in FIG. 6, the angle of incidence of incident light 8 incident on a reflecting surface 7 varies by $\delta$ when the incident light 8 is generally reflected once by the reflecting surface, the angle of reflection of reflected light 9 varies by $\delta$ in the opposite direction, and if the light intensity distribution of the incident light 8 is f(p) leftwardly at a right angle with respect to the optical axis thereof, the light intensity distribution of the reflected light 9 is f(p) rightwardly at a right angle with respect to the optical axis thereof. Also, when the reflected light 9 is further reflected by the oppositely facing reflecting surface, the optical axis and light intensity distribution of that reflected light become the same as those of the incident light 8. That is, what results from the incident light 8 being reflected an odd number of times is the same as the reflected light 9 obtained by being reflected once, and what results from the incident light 8 being reflected an even number of times is the same as the incident light 8.

Figure 7:
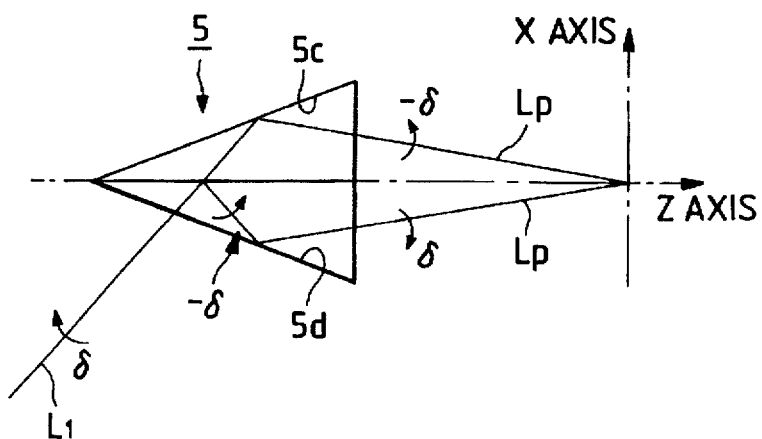
FIG. 7 is an illustration illustrating a variation in the optical axis of each divisional beam resulting from a variation in the optical axis of a laser beam in the first embodiment.

Accordingly, when as shown in FIG. 7, the optical axis of the laser beam $L_1$ deviates by $\delta$, the optical axes of one divisional beam $L_1$ transmitted through the half mirror $5e$ of the prism unit 5 and reflected once by one inclined surface $5c$ and the other divisional beam $L_p$ reflected by the half mirror $5e$ and reflected again by the other inclined surface $5d$ become inclined by $\delta$ in opposite directions because the number of times of reflection of the one divisional beam is an odd number and the number of times of reflection of the other divisional beam is an even number, and as a result, the optical axis of the composite wave $L_0$ does not vary.

Figure 8:
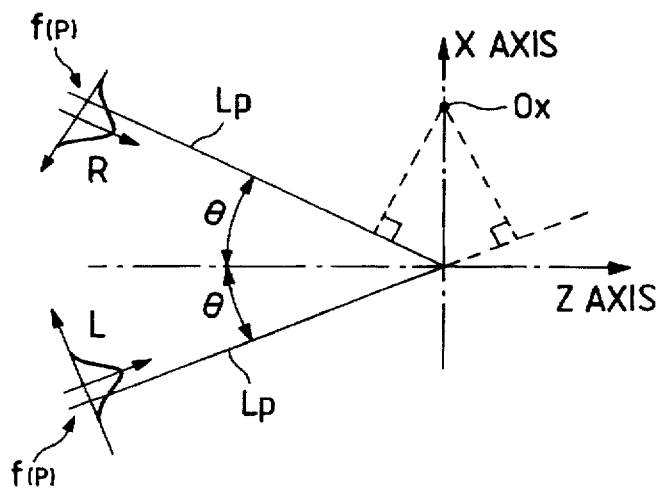
FIG. 8 is an illustration illustrating a variation in the light intensity distribution of each divisional beam resulting from a variation in the light intensity distribution of the laser beam in the first embodiment.

Also, as shown in FIG. 8, with regard to the amounts of variation in the light intensity distributions of the two divisional beams $L_p$, when the light intensity distribution of the laser beam $L_1$ varies, if the number of times of reflection of one divisional beam $L_p$ is an odd number and the number of times of reflection of the other divisional beam is an even number, the absolute values of said amounts of variation are the same at a position Ox deviating by the same amount in opposite directions with respect to the optical axis of each divisional beam $L_P$ and the signs of said absolute value are opposite to each other. Accordingly, even if the undivided light intensity distribution of the laser beam $L_1$ varies, the light intensity distribution of the composite wave $L_0$ will not vary.

Figure 9:
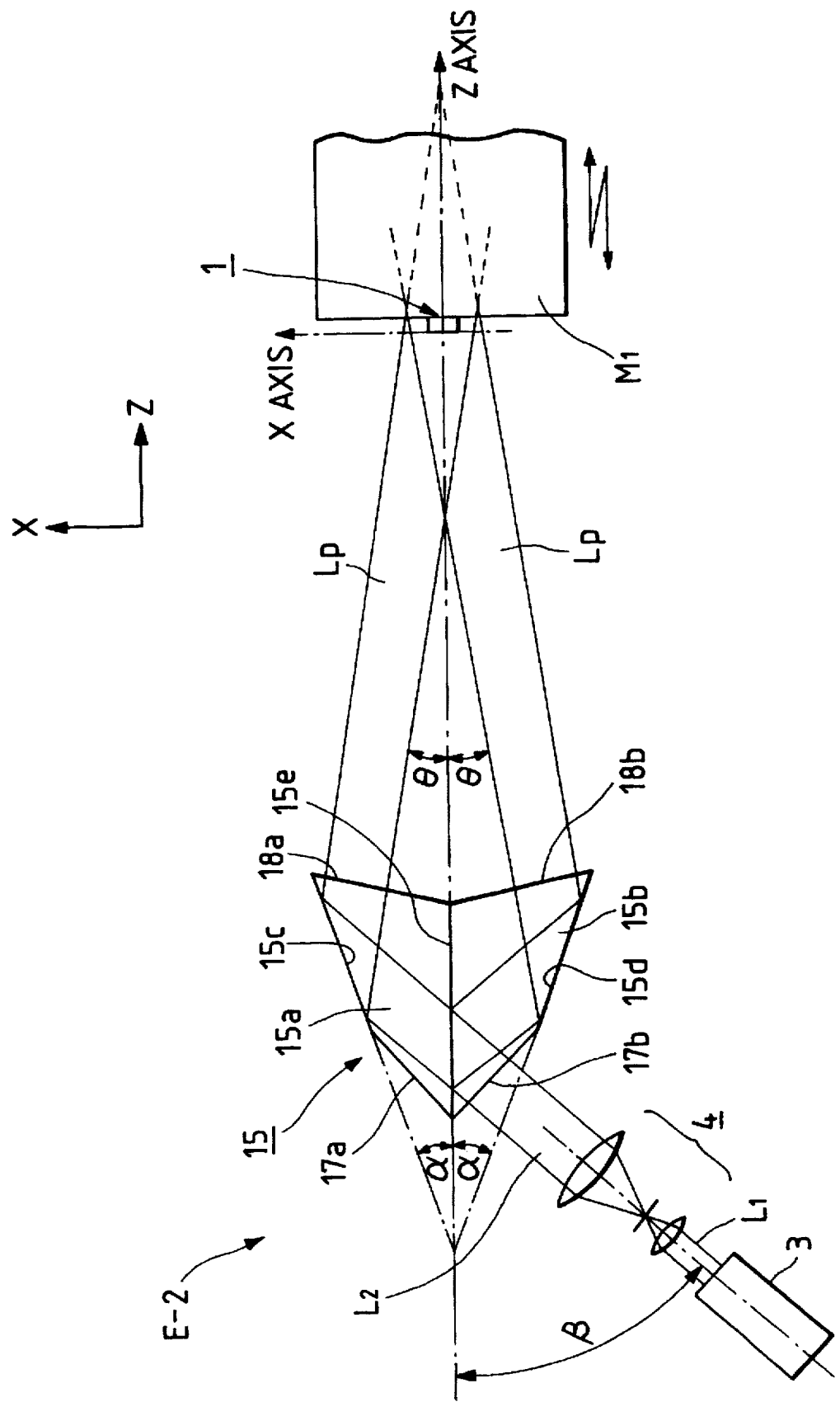
FIG. 9 is an illustration illustrating a second embodiment of the present invention.

FIG. 9 shows a moving object rectilinear movement accuracy measuring apparatus E-2 according to a second embodiment, in which instead of the prism unit 5 in the first embodiment, portions 17a and 17b of the inclined surfaces 15c and 15d, respectively, of a prism unit 15 similar to the prism unit 5 are inclined with respect to the remaining portions so that an enlarged beam $L_2$ may enter the surface of the prism unit 15 perpendicularly thereto and the bottom surfaces 18a and 18b of rectangular triangle pole prisms 15a and 15b, respectively, are inclined with respect to a plane perpendicular to a half mirror 15e so that each divisional beam $L_P$ may emerge from the surface of the prism unit 15 perpendicularly thereto and in addition, anti-reflection film is applied to the inclined surfaces 17a, 17b, 18a and 18b of the prism unit 15. The two-division pin photodiode unit 1, the laser source 3, the enlarging optical system 4, the moving object $M_1$, the enlarged beam $L_2$, the divisional beams $L_P$, etc. are the same as those in the first embodiment and therefore need not be described.

In the present embodiment, the enlarged beam $L_2$ entering the prism unit 15 and the divisional beams $L_P$ emerging therefrom are all perpendicular to the surface of the prism unit 15 and anti-reflection film is applied to the various surfaces of the prism unit 15 and as a result, the loss of energy and disturbance by reflection are greatly reduced. In the other points, the present embodiment is similar to the first embodiment and therefore need not be described any further.

Figure 10:
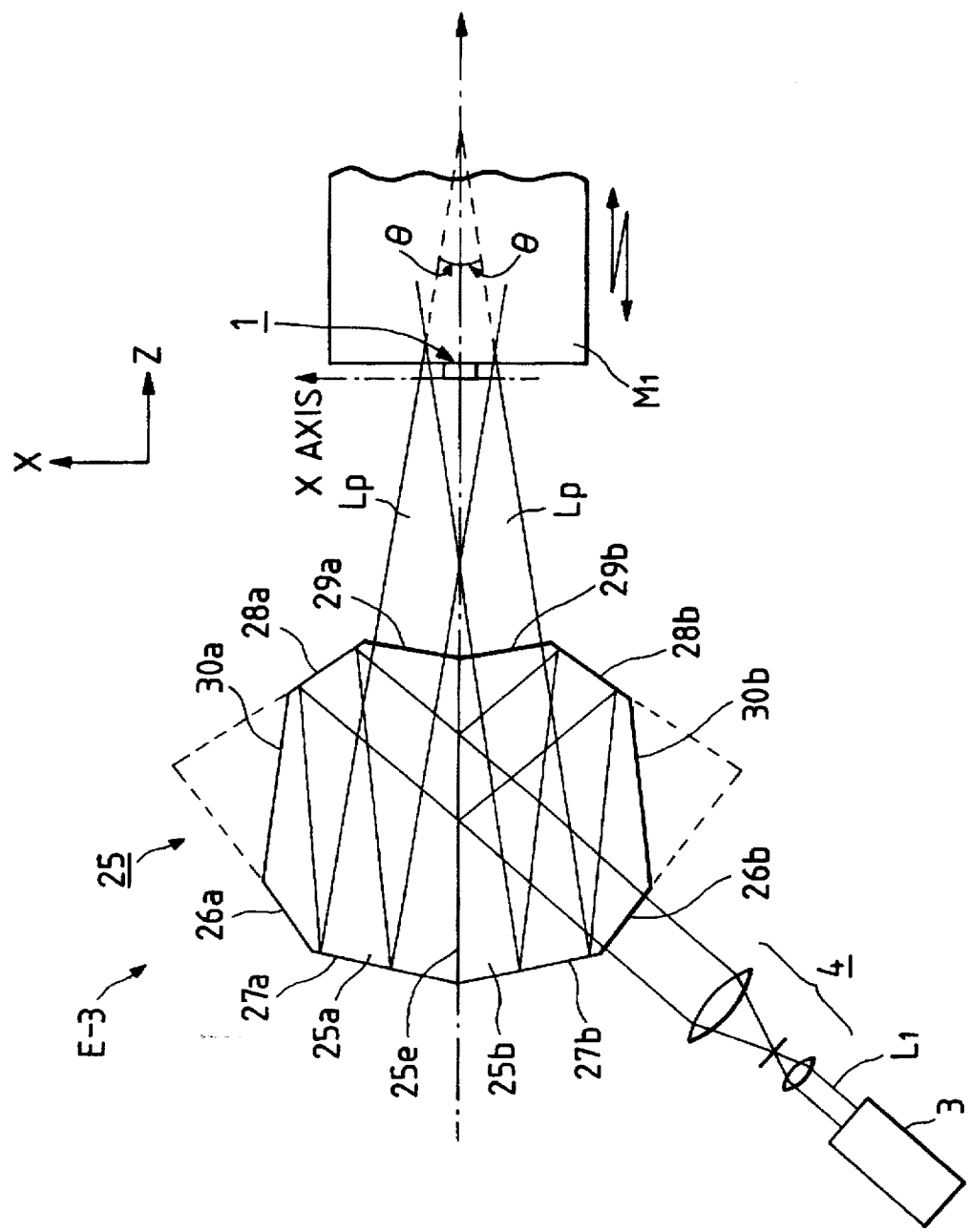
FIG. 10 is an illustration illustrating a third embodiment of the present invention.
Figure 11:
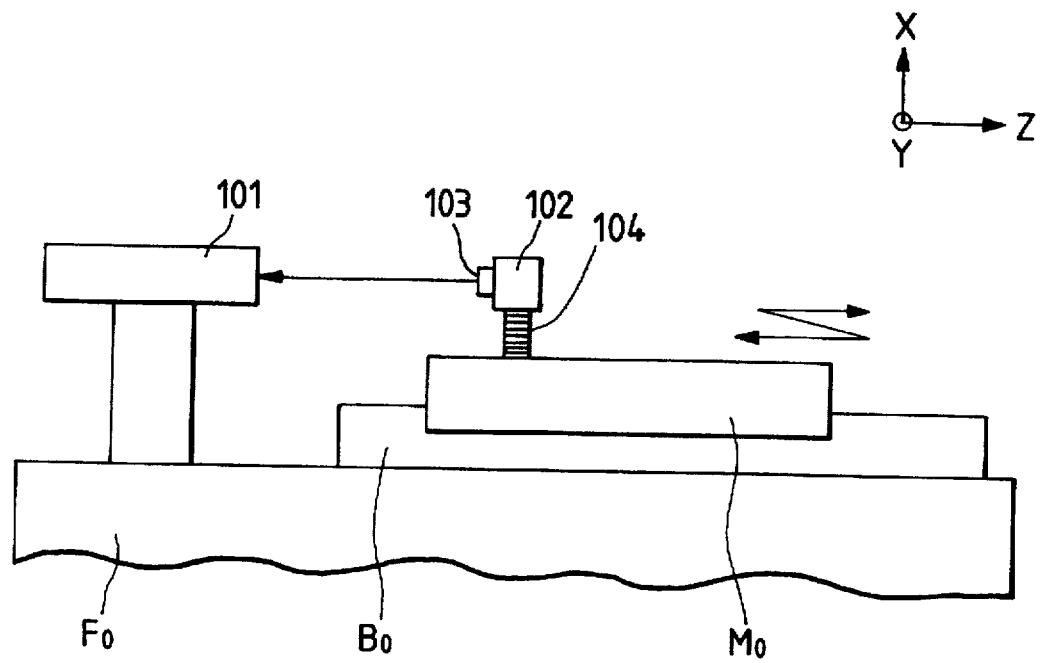
FIG. 11 is an illustration illustrating an example of the prior art.
Figure 12:
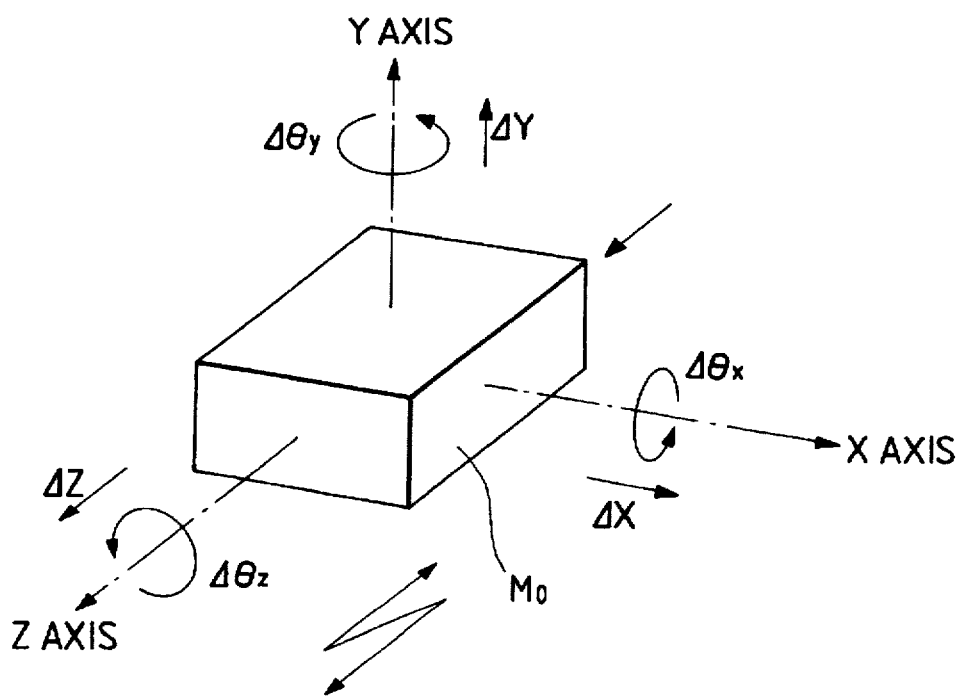
FIG. 12 is an illustration illustrating the accuracy of the rectilinear movement of a moving object.

FIG. 10 shows an apparatus for detecting motion of a moving object E-3 according to a third embodiment, in which a prism unit 25 comprising a pair of hexagon pole prisms 25a and 25b joined together with a half mirror 25e interposed therebetween are used in lieu of the prism unit 5 in the first embodiment and the hexagon pole prisms 25a and 25b have side surfaces 26a and 26b for providing entrance surfaces for causing the enlarged beam $L_2$ to enter them perpendicularly thereto, pairs of mirror surfaces 27a, 27b and 28a, 28b for internally reflecting divisional beams $L_P$ divided by a half mirror 25e, and exit surfaces 29a and 29b for causing the divisional beams $L_P$ to emerge therefrom perpendicularly thereto. The ridgeline angle between each side surface 26a, 26b and one mirror surface 28a, 28b is chamfered by an inclined surface 30a, 30b to downsize the whole of the prism unit 25. Also, anti-reflection film is applied to the side surfaces 26a and 26b which provide entrance surfaces for the enlarged beam $L_2$ and the exit surfaces 29a and 29b from which the respective divisional beams $L_P$ emerge. The two-division pin photodiode unit 1, the laser source 3, the enlarging optical system 4, the moving object $M_1$, the enlarged beam $L_2$, the divisional beams $L_P$, etc. are similar to those in the first embodiment and therefore need not be described.

According to the present embodiment, the enlarged beam $L_2$ entering the prism unit 25 and the divisional beams $L_P$ emerging therefrom are all perpendicular to the surface of the prism unit 25. Moreover, anti-reflection film is applied to the surface and as a result, the loss of energy and disturbance by reflection are greatly reduced. Also, the two divisional beams $L_P$ can be made to intersect each other near the prism unit 25 and therefore, the entire apparatus including the rectilinear movement measuring apparatus E-3 and the moving object $M_1$ can be greatly downsized. In the other points, the present embodiment is similar to the first embodiment and therefore need not be described any further.

The construction as described above achieves effects as will be described below.

There is no possibility of any measurement error being caused by the displacement of the optical axis of the laser beam and a variation in the light intensity distribution of the laser beam due to the thermal strain, displacement, etc. of the light source. Moreover, even very minute positional deviations of the moving object can be detected highly accurately. Also, there is no possibility of measurement accuracy being varied by the beam diameter of the laser beam. As a result, the accuracy of the rectilinear movement of the moving object can be measured with great accuracy.

What is claimed is:

1. An apparatus for measuring deviation of rectilinear movement of a moving object, comprising:

optical means for dividing a light beam into a pair of divided light beams, reflecting one of the divided light beams an even number of times and reflecting the other divided light beam an odd number of times, and thereafter intersecting the divided light beams to form static interference fringes;

a two-division pin photodiode detector having a pair of detecting elements spaced slightly apart from one another in a predetermined direction which intersects a direction of rectilinear movement of the moving object, provided integrally with the moving object for detecting the light intensity of the interference fringes while the moving object moves; and a substraction circuit for calculating the difference between two signals from said pair of detecting elements, so as to measure deviation of rectilinear movement of the moving object in the predetermined direction.

2. An apparatus according to claim 1, wherein said optical means has a laser source.

3. An apparatus according to claim 1, wherein said optical means has a prism unit comprising a half mirror and a pair of prisms disposed so as to be plane-symmetrical with respect to said half mirror.

4. An apparatus according to claim 3, wherein a surface of said prism unit which receives the light beam is perpendicular to the optical axis of the light beam.

5. An apparatus according to claim 3, wherein anti-reflection film is provided on said surface of said prism unit which receives the light beam.

6. An apparatus according to claim 3, wherein said surface of said prism unit which discharges each divided light beam is perpendicular to the optical axis of each of the divided light beams.

7. An apparatus according to claim 3, wherein anti-reflection film is provided on said surface of said prism unit which discharges each divided light beam.

8. An apparatus for measuring deviation of rectilinear movement of a moving object, comprising:

optical means for forming static interference fringes having an intensity distribution which is uniform in a first direction of rectilinear movement of the moving object and non-uniform in a second direction which intersects the first direction; and a detector provided integrally with the moving object for detecting the light intensity of a part of the interference fringes while the moving object moves in the first direction, so as to measure deviation of rectilinear movement of the moving object in the second direction.

9. An apparatus according to claim 8, wherein said optical means has a laser source.

10. An apparatus according to claim 8, wherein said detecting means has a plurality of detectors spaced apart from one another in a direction which intersects the direction of movement thereof.

11. An apparatus according to claim 10, wherein said detectors each have a pin photodiode.

12. A method for measuring deviation of rectilinear movement of a moving object, comprising the steps of:

forming static interference fringes having an intensity distribution which is uniform in a first direction of rectilinear movement of the moving object and non-uniform in a second direction which intersects the first direction; and detecting the light intensity of a part of the interference fringes while the moving object moves in the first direction, so as to measure deviation of rectilinear movement of the moving object in the second direction.

* * * * *

UNITED STATES PATENT AND TRADEMARK OFFICE
CERTIFICATE OF CORRECTION

PATENT NO. : 5,699,158
DATED : December 16, 1997
INVENTOR(S) : Negishi

It is certified that error appears in the above-identified patent and that said Letters Patent is hereby corrected as shown below:

COLUMN 2:

Line 17, "1 mm" should read --1 m--.

COLUMN 6:

Line 5, "25" should be deleted.

COLUMN 7:

Line 35, "detecting" should read --detecting rectilinear--.

COLUMN 8:

Line 31, "substraction" should read --subtraction--.

Signed and Sealed this

Twenty-ninth Day of September, 1998

Attest:

BRUCE LEHMAN

*Attesting Officer*  *Commissioner of Patents and Trademarks*